United States Patent [19]

Czermak et al.

[11] Patent Number: 4,543,033
[45] Date of Patent: Sep. 24, 1985

[54] INDUSTRIAL ROBOT

[75] Inventors: Ladislaus Czermak, Reichertshofen; Winfried Steinhart, Haberskirch, both of Fed. Rep. of Germany; Karl-Franz Binder, Ingolstädter Strasse 22, 8077 Reichertshofen, Fed. Rep. of Germany; Paul Steinhart, Herbrechtingen, Fed. Rep. of Germany

[73] Assignee: Karl-Franz Binder, Reichertshofen, Fed. Rep. of Germany

[21] Appl. No.: 477,813

[22] Filed: Mar. 22, 1983

[30] Foreign Application Priority Data

Mar. 30, 1982 [DE] Fed. Rep. of Germany ....... 3211688

[51] Int. Cl.$^4$ ............................................. B25J 9/00
[52] U.S. Cl. ...................................... 414/732; 901/16; 901/42; 414/730; 414/4; 414/917
[58] Field of Search ............... 414/732, 735, 739, 917, 414/4, 730; 901/42, 43, 16, 19

[56] References Cited

U.S. PATENT DOCUMENTS 3,606,162 9/1971 Lehmann .......................... 901/16 X
4,275,986 6/1981 Engelberger et al. .......... 414/739 X
4,453,833 6/1984 Bisiach ................................. 414/735

FOREIGN PATENT DOCUMENTS 2460762 3/1981 France ............................... 414/917

Primary Examiner—Terrance L. Siemens
Attorney, Agent, or Firm—Karl F. Ross; Herbert Dubno

[57] ABSTRACT

A robot for purposes of production and/or assembly comprises an arm carrying a holder for a tool, operating device or the like and being movable in three dimensions in consequence of appropriate guides. The holder itself can have various degrees of freedom through arrangement of hinges, rotational axes or the like and all holder movements for individual operating processes may be programmable. The holder is connected indirectly or directly to the arm through a double parallelogram linkage integrated into one unit, wherein the parallelogram linkage rod pairs extend obliquely one to the other, and a pivot angle displacing mechanism is associated with this linkage.

3 Claims, 3 Drawing Figures

INDUSTRIAL ROBOT

FIELD OF THE INVENTION

The present invention relates to a robot for industrial purposes, e.g. production and/or assembly of parts, and more particularly to a robot having an arm which carries a holder for a tool, or other operating device and which is movable in three dimensions, the holder itself possibly having various degrees of freedom through hinges, rotational axes or the like, with the holder movements for individual operating processes being programmable.

BACKGROUND OF THE INVENTION

Robots for diverse purposes are becoming increasingly important. They are used in situations requiring recurrent operation processes whenever it is important how accurately the work is performed or when quality specifications are set. Modern electronic technology has the advantage that rapid and reliable programming of even the most complicated operating processes can be achieved. This technology generally uses two methods. These methods, which in the language of the art are known as "off-line" or "teach-in", permit programming or control of the robot to be performed remotely in terms of both space and time. In known robots, the "teach-in" method is utilized; in this method the robot itself becomes the programmer. This represents a loss in operating time, as pre-programming cannot be performed independently of the robot. A further significant disadvantage of known robots is that changes in the angle of a tool mounting results in changes to the spatial positions, which must then be reinstated, i.e. a program correction has to take place and this in turn is time-consuming.

It would thus be a desirable characteristic of a robot if the spatial position of the holder, or of a tool or an operating device held by the holder, is not lost when the holder is turned or inclined. Moreover, it is desirable to enable programming by the "off-line" method.

OBJECTS OF THE INVENTION

It is the object of the invention to achieve both of these desiderata with an improved robot.

SUMMARY OF THE INVENTION

According to the present invention there is provided an industrial robot comprising an arm movable in three dimensions, a tool or component holder coupled to the arm by a double parallelogramatic linkage in which the parallelograms are so interconnected that one pair of parallel elements of one of the parallelograms extends at an angle relative to one pair of parallel elements of the other parallelogram, and displacing means for displacing the linkage to vary said angle.

In a preferred embodiment, the holder is connected directly or indirectly to the arm through a double parallelogram guide integrated into one unit, wherein the parallelogram guide rod pairs extend obliquely one to the other, and a pivot angle displacing mechanism is associated with the parallelogram guide. The advantage of such a double-parallelogram guide can be appreciated by consideration of the case, by way of example only, of an assembly robot having in the holder a box-spanner type tool by means of which a screw is to be introduced into parts to be connected together or inserted in the holder.

After such as an operating process has been preprogrammed, the introduction of the screw does not usually present any difficulties. If an axial correction of the tool holder is necessary for any reason, this can be readily undertaken so the spatial position of the tool is not lost. Previously, a part of the program had to be changed for this purpose, which is no longer necessary here and thus a saving of time is effected. In addition, the "off-line" programming method can be utilized, i.e. the programmer can set up his program at a separate programming station and, after preparation of the program, transfer it to the robot-control computer. It is also of advantage that such measures represent only a small additional cost, which is of negligible significance compared with the costs that would arise if the same problems were to be overcome through electronic control.

In a preferred embodiment, the parallelogram guide adjoining the arm has fixed articulation points on an axle of the arm, the axle being rotatably and drivably mounted in support means of the arm. In that case, it is advantageous for the pivot angle range of the holder, which is provided at the free end of the parallelogram guide extending away from the arm, to be at least 90°.

In order to keep the load-carrying capacity at the holder as high as possible, the guide rod, near to the arm, of the parallelogram guide adjoining the arm may be prolonged beyond its pivot points in both directions and connected by one protruding end to a displacing spindle while the other end forms a guide rod of the parallelogram guide remote from the arm.

For a simple connection of the spindle with the appropriate prolonged end of the prolonged guide rod, it is advantageous to equip the spindle with a nut or other threaded element which is pivotably connected to the protruding rod end.

In order to create a closed and protected unit, which can automatically adapt to changing angles, the spindle may be mounted in a housing with a flange-mounted drive motor, the housing being pivotably connected to the axle of the arm.

Finally, it is advantageous, from the viewpoint of providing as many displacement permutations as possible, that the arm equipped with the double parallelogram guide engage a vertical guide to be displaceable in height, the vertical guide itself being arranged on a form of cross-slide.

BRIEF DESCRIPTION OF THE DRAWING

An embodiment of the present invention will now be more particularly described by way of example with reference to the accompanying drawing, in which.

SPECIFIC DESCRIPTION

Figure 1:
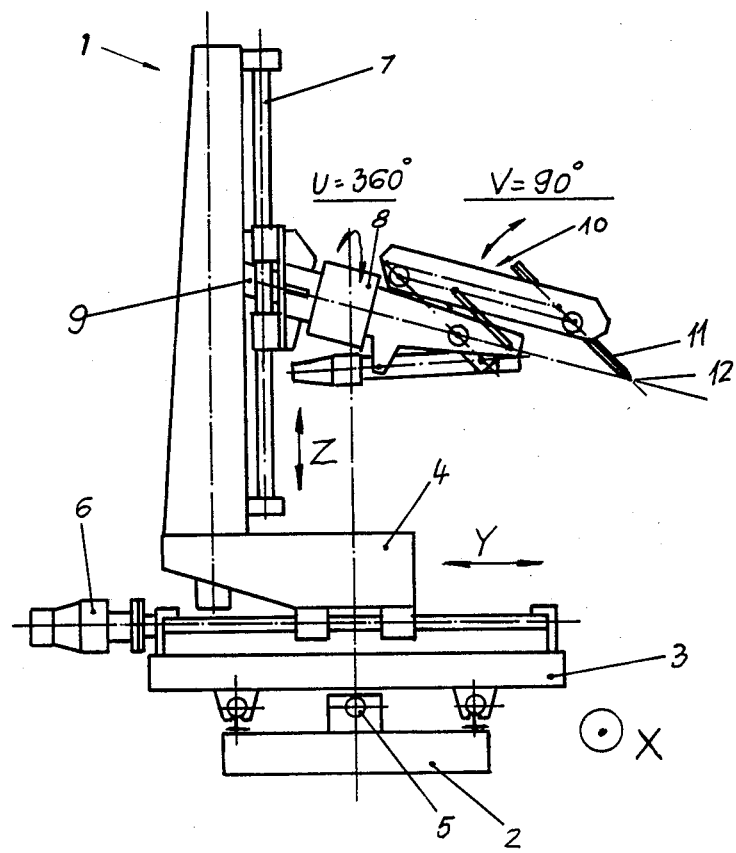
FIG. 1 is a schematic side elevational view of a robot embodying the present invention, showing one end setting of a holder of the robot.
Figure 2:
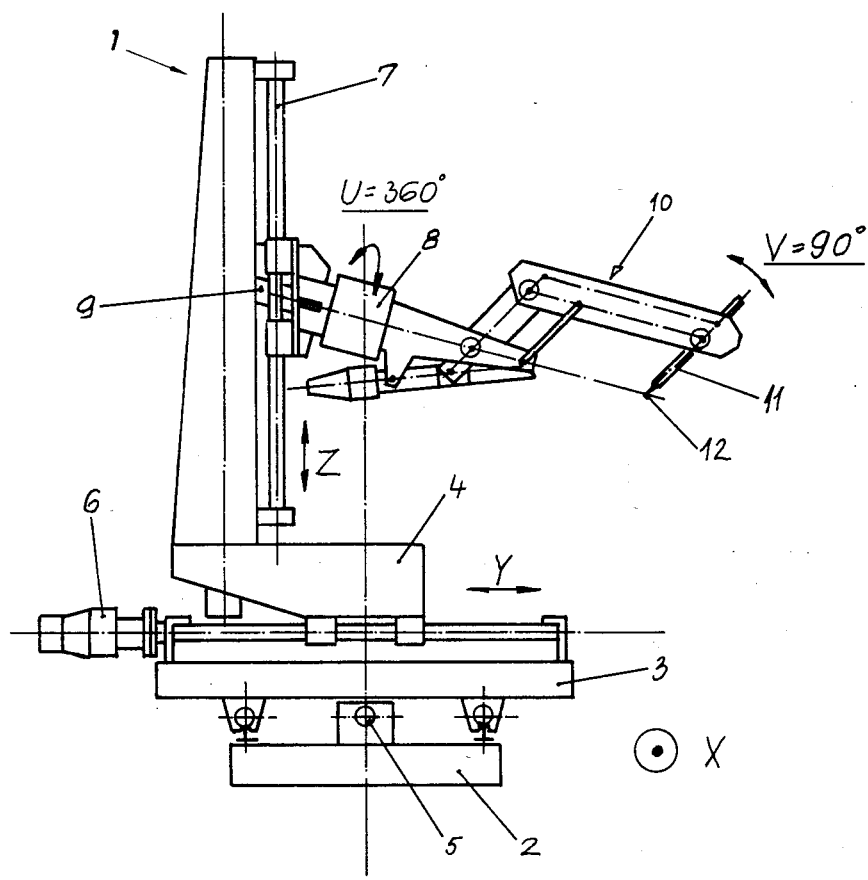
FIG. 2 is a view similar to FIG. 1 but showing the other end setting of the holder.

FIGS. 1 and 2 show robot 1 for any desired purpose which comprises a base 2 on which a longitudinal slide 3 is guided. This slide 3 carries a transverse slide 4 and the slides 3 and 4 together form a cross-slide. The two slides 3 and 4 are equipped with drives 5 and 6. The slide 4 carries a column guide 7, which serves as a support for a carrier arm 8. With the described arrangement, the arm 8 is movable in three dimensions as represented in FIGS. 1 and 2 by X, Y and Z.

The arm 8 is not only displaceable vertically on the guide 7 but is also rotatable by a drive 9. Connected to the arm 8 is a double parallelogrammatic guide linkage 10, which at its free end carries a holder 11 for a tool 12.

Figure 3:
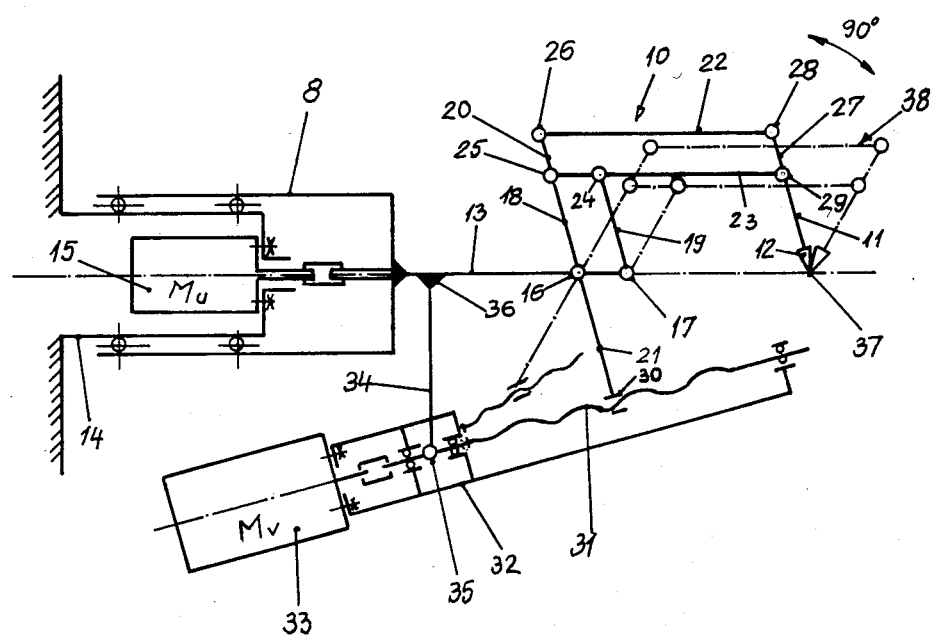
FIG. 3 is a schematic representation, drawn to be enlarged scale, of components of the robot showing the range of movement of the holder and its associated guide linkage and displacing means.

In FIG. 3, the double parallelogrammatic guide linkage 10 is schematically shown in more detail. It can be seen that the arm 8 comprises a shaft 13 and is rotatably mounted on a bearing sleeve 14, the arm being drivable by a motor 15 for rotation through 360°. Two pivot points 16 and 17, to which guide rods 18 and 19 are connected, are disposed on the shaft 13. The guide rod 18 has an upper prolongation or extension 20 and a lower prolongation or extension 21. Guide rods 22 and 23 extending obliquely to the guide rod 18 and its extension 20 are pivotably connected thereto at pivot points 26 and 25. The guide rod 23 is pivotally connected at 24 to the guide rod 19 and the parallelogram 20, 22, 23 is closed by a short guide rod 27 with pivot points 28 and 29. The guide rod 27 continues as the holder 11. The pivot range of the entire linkage amounts to 90°, as indicated by the curved double arrow.

The downwardly directed prolongation 21 of the guide rod 18 is pivotably connected at its free end to a nut 30, which is threadedly engaged on a displacing spindle 31. The spindle 31 is mounted in a housing 32, on which a drive motor 33 is mounted by a flange. For the pivotable mounting of the housing 32 in the plane of the shaft 13, the housing 32 is partly encompassed by a fork 34 so that it can be pivoted about an axis 35 when this is required by the setting of the nut 30. The fork is firmly connected at 36 with the carrier arm axle 13.

The double-parallelogram guide linkage 10 operates in the following manner:

If it is assumed that the spatial tool position 37 has been programmed for an operating process and if for any desired reason it becomes necessary during the course of this process to change the attitude of the holder 11 or tool 12, a pulse is applied to the motor 33 and the spindle 31 displaces the double parallelogram guide linkage 10 from the setting indicated by the thick solid lines to the setting 38 indicated by the thin solid lines, the spindle together with the housing 32 and motor 33 being pivoted about the axis 35 as indicated by the represented part of the spindle associated with the setting 38. By virtue of the guidance of the holder 11 and tool 12 by the linkage 10, the effective work zone 37 of the tool does not change with the change in attitude of the holder and the tool.

We claim:

1. An industrial robot comprising:
   a support bed displaceable in two mutually perpendicular horizontal directions;
   guide means on said support bed forming a vertical guide;
   means mounting an arm on said guide for vertical displacement thereon, said mounting means including means for rotating said arm about an arm axis;
   a double parallelogrammatic linkage connected to said arm and having two parallelograms each with four pivotally connected elements so interconnected that one pair of parallel first elements of one of said parallelograms extend at an angle relative to one pair of parallel second elements of the other of said parallelograms, said one of said parallelograms being pivotally connected to said arm at one location by one of said first elements;
   a holder connected to said linkage by said other of said parallelograms, said one of said first elements extending beyond said one of said parallelograms to form an element of said other parallelogram at one end of said one of said first elements, said one of said first elements being formed with an extension at the other end thereof;
   a housing pivotally connected to said arm at a location spaced from said one location;
   a threaded spindle rotatable on said housing;
   a threaded member engaging said spindle and displaceable thereby while being pivotally connected to said extension for displacing said linkage to vary the angle.

2. The robot defined in claim 1 wherein said means for rotating said arm about said arm axis includes a shaft, a portion of said shaft extending beyond said one location forming one of the elements of said one of said parallelograms.

3. The robot defined in claim 1 wherein said holder is mounted on an element of said other of said parallelograms and said linkage is constructed and arranged to enable displacement of said holder through an angle of at least 90°.

* * * * *